US006892875B2

(12) United States Patent
DeVolpi

(10) Patent No.: US 6,892,875 B2
(45) Date of Patent: *May 17, 2005

(54) INTEGRAL KEYBOARD AND STORAGE ORGANIZER

(76) Inventor: Dean R. DeVolpi, 806 Buchanan Blvd., #115-233, Boulder City, NV (US) 89005

( * ) Notice: Subject to any disclaimer, the term of this patent is extended or adjusted under 35 U.S.C. 154(b) by 0 days.

This patent is subject to a terminal disclaimer.

(21) Appl. No.: 10/734,414

(22) Filed: Dec. 11, 2003

(65) Prior Publication Data

US 2004/0124104 A1 Jul. 1, 2004

Related U.S. Application Data

(63) Continuation-in-part of application No. 10/053,747, filed on Jan. 18, 2002, now Pat. No. 6,681,926.
(60) Provisional application No. 60/336,951, filed on Nov. 7, 2001.

(51) Int. Cl.[7] .............................................. B65D 69/00
(52) U.S. Cl. ...................... 206/224; 206/320; 361/680
(58) Field of Search ................................ 206/214, 216, 206/224, 305, 320, 371, 576, 577; 211/11, 126.1, 126.4, 131.1; 248/918; 361/680–683, 727

(56) References Cited

U.S. PATENT DOCUMENTS

| 5,265,735 A | * | 11/1993 | Hassel et al. ............... 206/214 |
| 5,576,929 A | * | 11/1996 | Uchiyama et al. .......... 361/680 |
| 5,598,921 A | * | 2/1997 | Hunt .......................... 206/214 |
| 5,835,344 A | * | 11/1998 | Alexander .................. 206/320 |
| 5,901,934 A | * | 5/1999 | Wilson ....................... 361/727 |
| 5,995,025 A | * | 11/1999 | Sternglass et al. ......... 361/680 |
| 6,078,495 A | * | 6/2000 | Cipolla et al. .............. 361/680 |
| 6,285,544 B1 | * | 9/2001 | Chandramohan ........... 361/680 |

* cited by examiner

Primary Examiner—Luan K. Bui
(74) Attorney, Agent, or Firm—Quinn & Quinn, P.C.; William J. Quinn; Cornelius P. Quinn

(57) ABSTRACT

The improved integral keyboard and storage organizer of the present invention provides a keyboard with a housing that can be hingably or slideably opened to access an integral storage organizer and has latches to maintain it in a closed arrangement, has a locking mechanism to secure the contents and has a separate access compartment for replacement of batteries and access to electronic components.

9 Claims, 4 Drawing Sheets

INTEGRAL KEYBOARD AND STORAGE ORGANIZER

CROSS REFERENCE TO RELATED APPLICATION

This application is a CIP of U.S patent application Ser. No. 10/053,747, filed on Jan. 18, 2002; now U.S. Pat. No. 6,681,926 and U.S. provisional patent application Ser. No. 60/336,951 filed Nov. 7, 2001, which are incorporated herein by reference.

FIELD OF THE INVENTION

The present invention pertains generally to computer keyboards and computer storage and organizer devices.

BACKGROUND OF THE INVENTION

Since the introduction of the personal computer, in addition to the typical desktop supplies such as pencils, pens, sticky notes and paper clips, items associated with the personal computer, such as diskettes, CD ROM disks and CD marking pens, are required to be readily available, and preferably close at hand to the desktop. Storage of such items upon the desktop reduces the amount of desktop space available, which is compounded by the reduction in desktop space occasioned by the placement of the computer keyboard and monitor upon the desktop. Various desktop organizers, for holding pens, pencils, paper clips, sticky notes, rubber bands and the like have been known prior to the introduction of personal computers, and are used and directed toward the optimization of useable desktop space. Further, since the introduction of the computer, various desktop organizers and storage devices have been devised which are attached to the computer's components and are directed toward organizing supplies and optimizing usable desktop space where a computer is involved. However, these prior art devices which provide storage of desktop supplies and sundry computer related items, are separate component accessories and still occupy precious desktop space.

In an effort to address the shortcomings of the prior art devices, an integral keyboard and storage organizer of U.S. patent application Ser. No. 10/053,747 was created by DeVolpi. Since the creation of the device of U.S. patent application Ser. No. 10/053,747, further improvements have been made that enhance its utility including the addition of, latching means, various locking means, and configurations allowing access to electronic components and batteries incident to wireless embodiments.

Accordingly, it is an object of the present invention to provide an improved integral keyboard and storage organizer which can store desktop supplies, sundry computer related items, and personal items, such as keys without necessitating the use of any additional space near the keyboard and incorporate latching means, various locking means, and configurations allowing access to electronic components and batteries incident to wireless embodiments.

SUMMARY OF THE INVENTION

The objects of the present invention are attained by a keyboard of the present invention, which may be wired or wireless, having an integral storage organizer, the utility of which is enhanced by the addition of, latching means to maintain the integral keyboard and storage organizer in a closed configuration, locking means to provide security to the contents of the storage organizer, and a further separate compartment through which electronic components and batteries that are incident to wireless keyboards can be accessed.

At the time personal computers were introduced, the keyboards of the personal computers utilized bulky mechanical switches which occupied nearly the entire interior of the keyboard case. Since that time the switching mechanisms utilized within the keyboards have been refined and miniaturized. A typical keyboard produced today utilizes a very thin membrane switch layer, as thin as 0.030 inches thick, upon which rubber dome switches are placed, which are also of low profile, and can be compressed to complete electrical conductivity in the membrane switch. The plastic keys of the keyboard reside upon the dome switches. A backer board is typically placed below the membrane switch to provide rigidity to the membrane switch so that it is not deflected upon actuation of the dome switches through the keys. Although the size of keyboard switching mechanisms have been drastically reduced in thickness, for ergonomic reasons, the dimensions of typical keyboard housings have not; as a result, an appreciable amount of the interior space within the housings of keyboards produced today is empty. The integral keyboard and storage organizer allows this empty space within the housing of computer keyboards to be utilized as an organizer for storage of desktop supplies, sundry computer related items and personal items. Further, the height of the keyboard can be increased without enlarging the footprint of the keyboard and thereby increase the depth and volume of the organizer without occupying any additional desktop space.

To improve the functionality of the integral keyboard and storage organizer, one or more latches may be included which are of sufficient strength to maintain the integral keyboard and storage organizer in a closed position in the event the integral keyboard and storage organizer is lifted or moved. Such latches are of particular utility with wireless integral keyboard and storage organizers where users typically lift the keyboard onto their lap, and absent some latching means, the contents of the storage compartment could be spilled.

Further, to improve the functionality of the integral keyboard and storage organizer, a locking means may be included to provide security to the contents of the storage organizer. Such locking means may be of any known internal or external mechanical or electromechanical mechanism such as, without limitation, a keyed lock, a coded lock, a key sequence lock where a key sequence is entered on the keyboard, a radio frequency or infrared actuated lock, an optical, magnetic, or electronic card actuated lock or a fingerprint reader actuated lock. It should be recognized that were such locking means is employed, the latches previously disclosed may be omitted since the locking means could maintain the integral keyboard and storage organizer in the closed position.

Finally, to improve the functionality of the integral keyboard and storage organizer, a further accessible and separate compartment from the storage organizer compartment can be included through which electronic components and batteries that are incident to wireless keyboards can be accessed.

In a first preferred embodiment of the improved integral keyboard and storage organizer of the present invention, an upper housing shell and a lower housing shell are provided. The keyboard switching mechanism is disposed within the upper housing shell which is typically comprised of the plastic keys which protrude through the upper housing shell and rest upon a layer of dome switches which in turn rest upon a membrane switch layer. A backer board is placed below the membrane switch, forming a bottom to the upper housing; the backer board preferably forms a seal with the inner surface of the upper housing shell to protect the membrane switch layer and dome switches from contaminants. The upper housing and the lower housing shell are connected together by a hinging means of one or more hinge elements, which are attached to or molded in the upper housing shell or the backer board of the upper housing, and attached to or molded in the lower housing shell when they were produced; the frontward ends of the upper housing shell and lower housing shell are therefore able to open and close from one another in a clam shell fashion. The lower housing shell is formed with a number of partitions which serve to form separate compartments; the partitions further serve as support for the backer board when the integral keyboard and storage organizer is in a closed position for keyboard use. The improved integral keyboard and storage organizer also includes one or more latches of sufficient strength to maintain the integral keyboard and storage organizer in the closed position when the integral keyboard and storage organizer is lifted or moved. The improved integral keyboard and storage organizer may also include locking means in addition to or in place of the latches to provide security to the contents of the storage organizer compartment and maintain it in a closed position. Finally, the improved integral keyboard and storage organizer may also include a further accessible and separate compartment from the storage organizer compartment through which electronic components and batteries incident to wireless keyboards can be accessed.

As an alternate configuration of the above first preferred embodiment, the upper housing and the lower housing shell would have the hinge elements of the hinging means located so that their rearward ends, rather than their frontward ends, are able to open and close in relation to one another.

In a second preferred embodiment of the improved integral keyboard and storage organizer of the present invention, an upper housing shell and a lower housing shell are provided. The keyboard switching mechanism is disposed within the upper housing shell which is typically comprised of the plastic keys which protrude through the upper housing shell and rest upon a layer of dome switches which in turn rest upon a membrane switch layer. A backer board is placed below the membrane switch, forming a bottom to the upper housing; the backer board preferably forms a seal with the inner surface of the upper housing shell to protect the membrane switch layer and dome switches from contaminants. The upper housing and lower housing shell are connected together by a sliding means, where the upper housing is formed with or has slide elements attached on its lower left and right sides, such as channels, and the lower housing shell is also formed with or has complementary slide elements attached on its upper left and right sides, which interconnect with the channels of the upper housing. The upper housing is therefore able to be slid in relation to the lower housing shell and thereby expose the storage organizer compartment within the lower housing shell. The lower housing shell is formed with a number of partitions which serve to form separate compartments; the partitions may also further serve as support for the backer board when the integrated keyboard and storage organizer is in a closed position for keyboard use. The slide mechanism of the integral keyboard and storage organizer also preferably incorporates one or more detent stops to prevent the upper housing from inadvertently becoming completely detached from the lower housing shell. The detent stops may be positioned in configurations such that the upper housing may be slid forward, rearward, or both in relation to the lower housing shell. The improved integral keyboard and storage organizer also includes one or more latches of sufficient strength to maintain the integral keyboard and storage organizer in the closed position when the integral keyboard and storage organizer is lifted or moved. The improved integral keyboard and storage organizer may also include locking means in addition to or in place of the latches to provide security to the contents of the storage organizer compartment and maintain it in a closed position. Finally, the improved integral keyboard and storage organizer may also include a further accessible and separate compartment from the storage organizer compartment through which electronic components and batteries incident to wireless keyboards can be accessed.

Within the embodiments described above, it must be recognized that the height of the upper housing shell and lower housing shell may be increased, to increase the depth and volume of the storage organizer, without increasing the footprint size occupied by the integral keyboard and storage organizer.

It can be observed from the embodiments of the invention described above, that an improved integral keyboard and storage organizer can be manufactured with no or minimal additional cost to that of a typical keyboard, while providing a storage organizer that keeps necessary supplies readily at hand yet occupies no addition desktop space.

Other objects, advantages and novel features of the present invention will become apparent from the following drawings and detailed description of the preferred embodiments.

DETAILED DESCRIPTION OF THE PREFERRED EMBODIMENTS

A first embodiment of the present invention will now be described with reference to FIG. 1.

Figure 1:
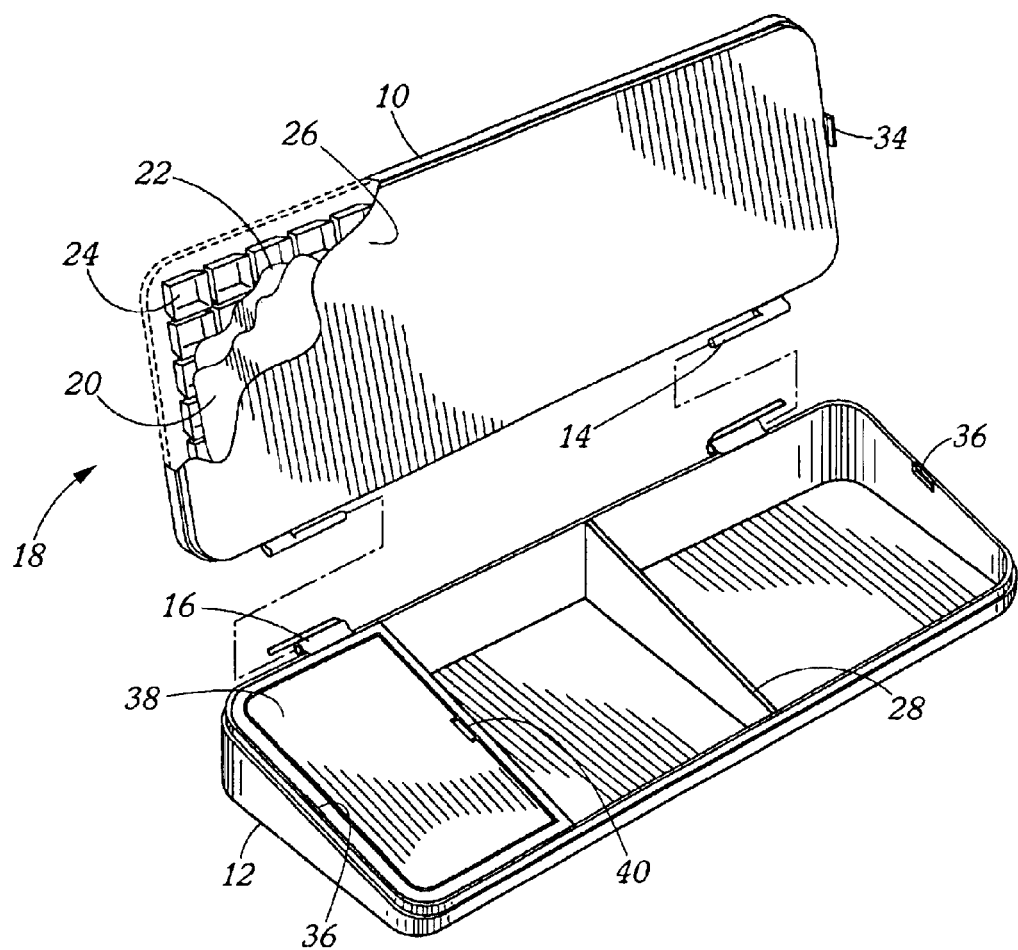
FIG. 1 is a partial sectional exploded perspective view of the first embodiment of the improved integral keyboard and storage organizer of the present invention.

The improved integral keyboard and storage organizer shown in FIG. 1 comprises an upper housing shell 10, and a lower housing shell 12. The upper housing shell 10 is formed with hinge element pins 14 at its lower rearward end; and the lower housing shell 12 is formed with hinge element pin receptacles 16 at its upper rearward end. In assembled fashion hinge element pins 14 are received within hinge element pin receptacles 16, thereby allowing the upper housing shell 10 to open and close in a clam shell fashion in relation to lower housing shell 12. Disposed within the upper housing shell 10 is a keyboard switching mechanism 18, typically comprised of a membrane switch layer 20, above which is a dome switch layer 22 upon which are placed keys 24. A backer board 26 is located below the membrane switch layer and preferably is in sealing contact with the inner surface of upper housing shell 10. Within the lower housing shell 12, a number of partitions 28 may be formed or placed, forming a number of separate compartments. Upon the lower end of upper housing shell 10 one or more latch tabs 34 are located which releasably engage latching groves 36 located at upward end of lower housing shell 12. Within lower housing shell 12 an electronics access cover 38 is located to provide access to electronic elements and to allow batteries to be replaced. Electronics access cover 38 is formed with an access cover latch 40 to secure electronics access cover 38 in place.

A second embodiment of the present invention will now be described with reference to FIG. 2.

Figure 2:
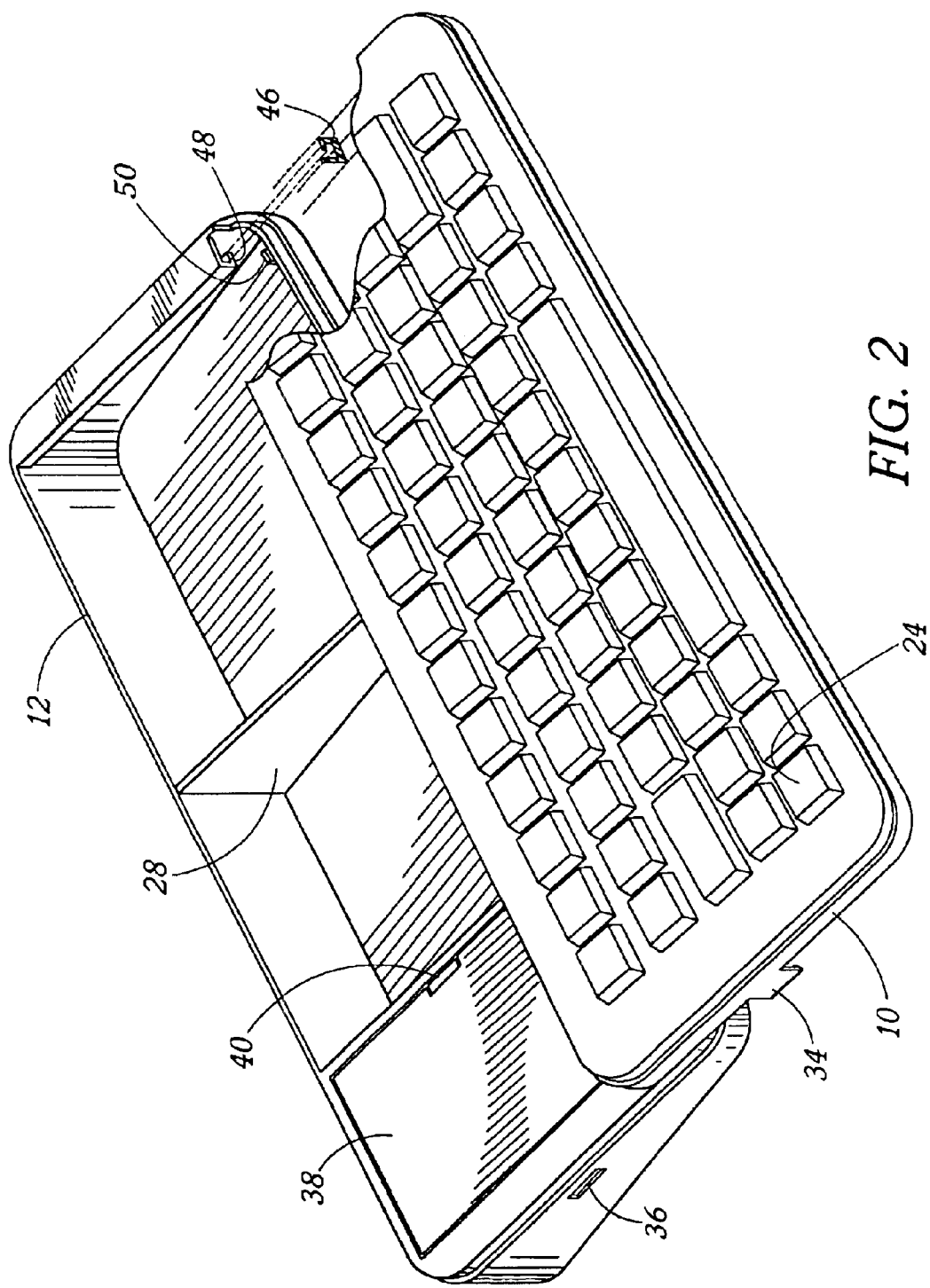
FIG. 2 is a partial sectional perspective view of a second embodiment of the improved integral keyboard and storage organizer of the present invention.

The improved integral keyboard and storage organizer shown in FIG. 2 comprises an upper housing shell 10, and a lower housing shell 12. The upper housing shell 10 is formed with first sliding track elements 46 at both its lower left and lower right ends; lower housing 12 is formed with second sliding track elements 48 at its upper left and upper right ends. In assembled fashion, first sliding track elements 46 slideably engage second sliding track elements 48, attaching the upper housing shell 10 to the lower housing shell 12 and allowing the upper housing shell 10 to slide in relation to the lower housing shell 12, exposing the interior of lower housing shell 12. Disposed within the upper housing shell 10 is a keyboard switching mechanism. Within the lower housing shell 12, a number of partitions 28 may be formed or placed forming a number of separate compartments. Adjacent to each pair of first sliding track element 46 and second sliding track element 48, are slide stop protrusions 50 which contact each other at the fully open position and prevent the upper housing shell 10 from being completely separated from lower housing shell 12. Upon the lower end of upper housing shell 10 one or more latch tabs 34 are located which releasably engage latching groves 36 located at upward end of lower housing shell 12. Within lower housing shell 12 an electronics access cover 38 is located to provide access to electronic elements and to allow batteries to be replaced. Electronics access cover 38 is formed with an access cover latch 40 to secure electronics access cover 38 in place.

Figure 3:
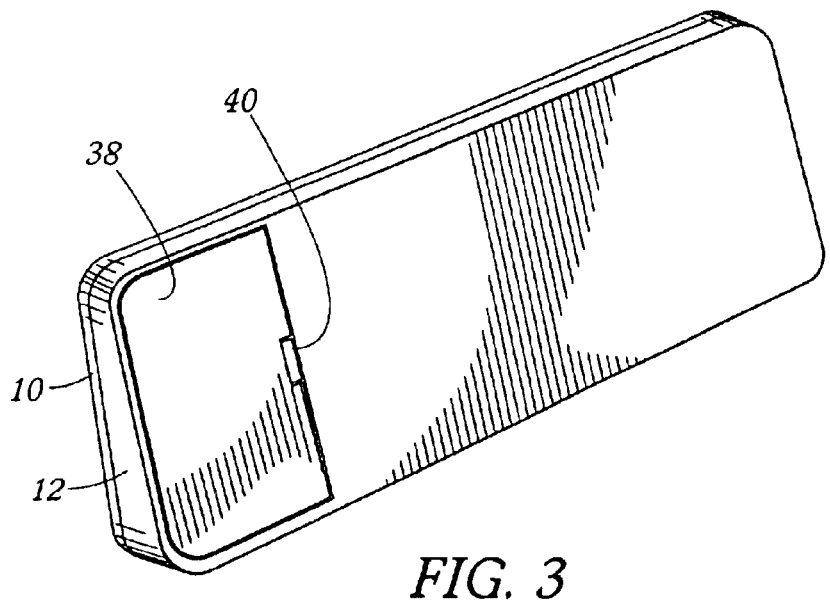
FIG. 3 is a perspective view of the bottom side of the improved integral keyboard and storage organizer of the present invention illustrating an alternate location of the electronics access cover.

In FIG. 3 the bottom side of the lower housing shell 12 is shown with electronics access cover 30 located therein to provide access to electronic elements and to allow batteries to be replaced. An access cover latch 40 is formed on electronics access cover 38 to secure it in place.

Figure 4:
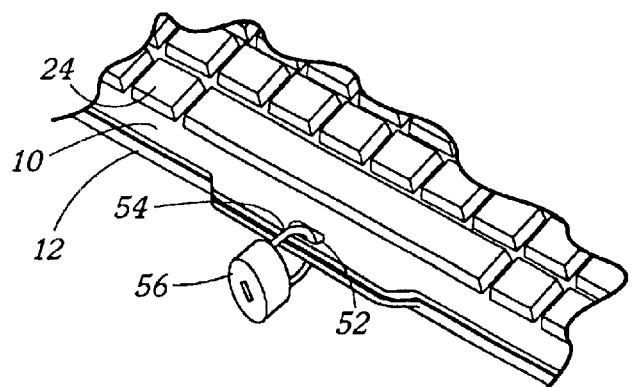
FIG. 4 is a partial perspective view of the improved integral keyboard and storage organizer of the present invention in a closed position illustrating one possible keyed locking means.

A simple keyed locking means of the present invention is illustrated in FIG. 4. Upper housing shell 10 and lower housing shell 12 are each formed with a locking aperture 52 through which the shackle 54 of padlock 56 may be secured to prevent upper housing shell 10 from being opened in relation to lower housing shell 12.

Figure 5:
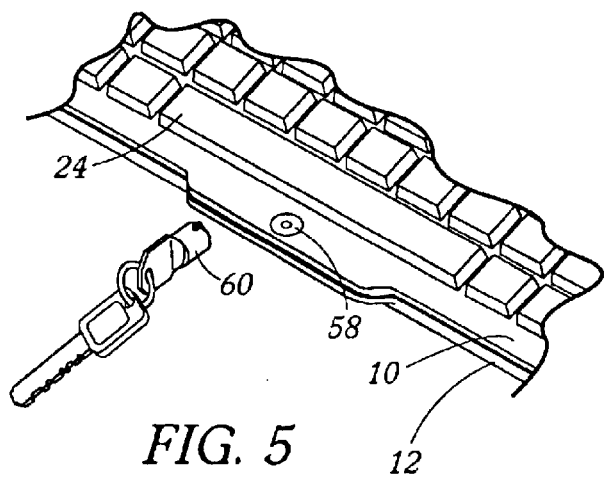
FIG. 5 is a partial perspective view of the improved integral keyboard and storage organizer of the present invention in a closed position illustrating a second possible keyed locking means.

Another simple keyed locking means of the present invention is illustrated in FIG. 5. A locking cylinder 58 into which a key 60 can be received is disposed in upper housing shell 10. Upon rotation of locking cylinder 58 with key 60 lower housing shell 12 may be selectively engaged to prevent upper housing shell 10 from being opened in relation to lower housing shell 12.

Figure 6:
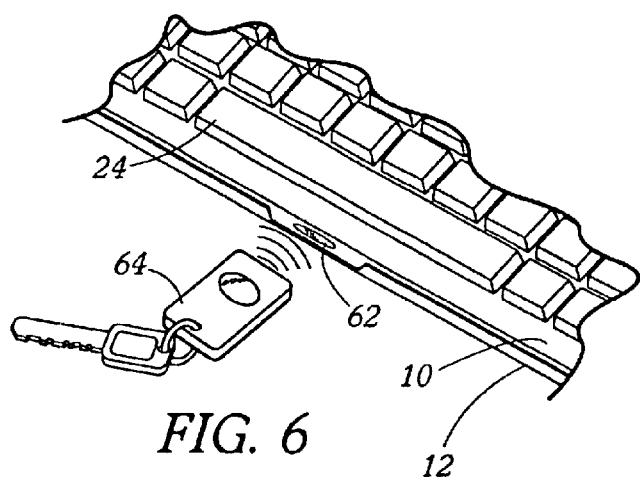
FIG. 6 is a partial perspective view of the improved integral keyboard and storage organizer of the present invention in a closed position illustrating an infrared type locking means.

In FIG. 6 an infrared receiver 62 is disposed within upper housing shell 10 which can received a signal from a transmitter 64 to selectively trigger an electromechanical locking mechanism to engage and prevent upper housing shell 10 from being opened in relation to lower housing shell 12.

Figure 7:
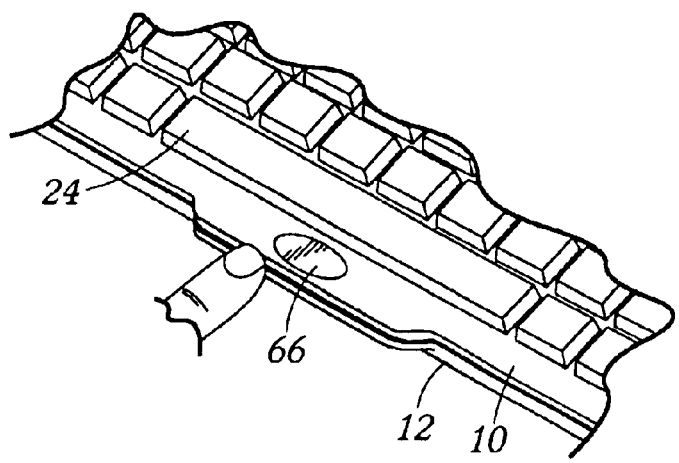
FIG. 7 is a partial perspective view of the improved integral keyboard and storage organizer of the present invention illustrating a fingerprint reader type locking means.

In FIG. 7 a finger print reader 66 is disposed within upper housing shell 10 to recognize distinct fingerprint patterns; upon recognition of a preprogrammed fingerprint pattern, fingerprint reader 66 selectively triggers an electromechanical locking mechanism to engage and prevent upper housing shell 10 from being opened in relation to lower housing shell 12.

Figure 8:
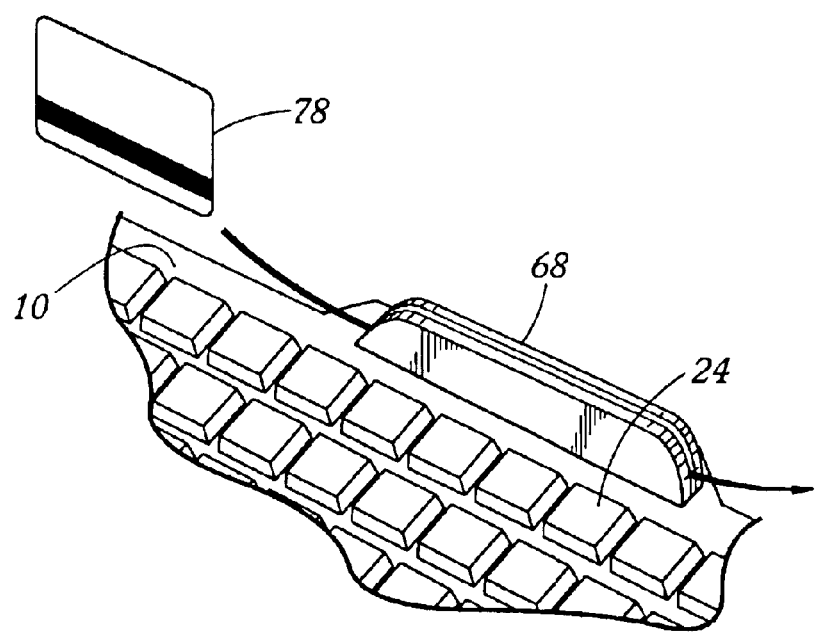
FIG. 8 is a partial perspective view of the improved integral keyboard and storage organizer of the present invention illustrating a magnetic card reader type locking means.

In FIG. 8 a magnetic card reader 68 is disposed within upper housing shell 10 to recognize distinct patterns of magnetically programmed cards 70; upon recognition of a particular programmed card 70, magnetic card reader 68 selectively triggers an electromechanical locking mechanism to engage to prevent upper housing shell 10 from being opened in relation to lower housing shell 12.

Although the detailed description of the drawings is directed toward illustrating the above described embodiments, it will be apparent, to one of ordinary skill in the art, that various known hinging means, compound hinging mechanisms, slideing means, counterbalance means, locking means, detent stop means, keyboard switching mechanisms, keyboard key arrangements, latching means, locking means and access panel configurations could be substituted for those depicted in the preferred embodiments described herein. The present invention is not limited to such preferred embodiments, as variations and modifications may be made without departing from the scope of the present invention as claimed herein.

What is claimed is:

1. An improved integral keyboard and storage organizer comprising:
   an upper housing, said upper housing containing and partially enclosing a keyboard switching mechanism;
   said keyboard switching mechanism adapted to communicate with a computer;
   a bottom surface of said upper housing defining the upper periphery of a storage compartment;
   a lower housing shell, an inner surface of said lower housing shell defining the lower periphery of a storage compartment;
   said storage compartment being physically and electrically isolated from said computer;
   hinging means, for hingably connecting said upper housing to said lower housing shell in a clam shell fashion, whereby upon application of an external force the angular separation between said upper housing and said lower housing shell may be selectably increased and decreased, thereby exposing and concealing said storage compartment; and
   latching means that when engaged maintain said upper housing and said lower housing shall in a state of minimal angular separation.

2. An improved integral keyboard and storage organizer according to claim 1, further comprising an electronics access compartment through which electrical components are accessible yet segregated from said storage compartment.

3. An improved integral keyboard and storage organizer comprising:
- an upper housing, said upper housing containing and partially enclosing a keyboard switching mechanism;
- said keyboard switching mechanism adapted to communicate with a computer;
- a bottom surface of said upper housing defining the upper periphery of a storage compartment;
- a lower housing shell, an inner surface of said lower housing shell defining the lower periphery of a storage compartment;
- said storage compartment being physically and electrically isolated from said computer;
- hinging means, for hingably connecting said upper housing to said lower housing shell in a clam shell fashion, whereby upon application of an external force the angular separation between said upper housing and said lower housing shell may be selectably increased and decreased, thereby exposing and concealing said storage compartment; and
- locking means that when engaged maintain the relationship between said upper housing shell and said lower housing shell and prevent access to said storage compartment.

4. An improved integral keyboard and storage organizer comprising:
- an upper housing, said upper housing containing and partially enclosing a keyboard switching mechanism;
- said keyboard switching mechanism adapted to communicate with a computer;
- a bottom surface of said upper housing defining the upper periphery of a storage compartment;
- a lower housing shell, an inner surface of said lower housing shell defining the lower periphery of a storage compartment;
- said storage compartment being physically and electrically isolated from said computer;
- hinging means, for hingably connecting said upper housing to said lower housing shell in a clam shell fashion, whereby upon application of an external force the angular separation between said upper housing and said lower housing shell may be selectably increased and decreased, thereby exposing and concealing said storage compartment; and
- an electronics access compartment through which electrical components are accessible yet segregated from said storage compartment.

5. An improved integral keyboard and storage organizer comprising:
- an upper housing, said upper housing containing and partially enclosing a keyboard switching mechanism;
- said keyboard switching mechanism adapted to communicate with a computer;
- a bottom surface of said upper housing defining the upper periphery of a storage compartment;
- a lower housing shell, an inner surface of said lower housing shell defining the lower periphery of a storage compartment;
- said storage compartment being physically and electrically isolated from said computer;
- sliding means, for slideably connecting said upper housing to said lower housing shell, whereby upon application of an external force said upper housing may be slid in parallel alignment to said lower housing shell to selectably expose and conceal said storage compartment; and
- locking means that when engaged maintain the relationship between said upper housing shell and said lower housing shell and prevent access to said storage compartment.

6. An improved integral keyboard and storage organizer comprising:
- an upper housing, said upper housing containing and partially enclosing a keyboard switching mechanism;
- said keyboard switching mechanism adapted to communicate with a computer;
- a bottom surface of said upper housing defining the upper periphery of a storage compartment;
- a lower housing shell; an inner surface of said lower housing shell defining the lower periphery of a storage compartment;
- said storage compartment being physically and electrically isolated from said computer;
- sliding means, for slideably connecting said upper housing to said lower housing shell, whereby upon application of an external force said upper housing may be slid in parallel alignment to said lower housing shell to selectably expose and conceal said storage compartment; and
- an electronics access compartment through which electrical components are accessible yet segregated from said storage compartment.

7. An improved integral keyboard and storage organizer comprising:
- an upper housing, said upper housing containing and partially enclosing a keyboard switching mechanism;
- said keyboard switching mechanism adapted to communicate with a computer;
- a bottom surface of said upper housing defining the upper periphery of a storage compartment;
- a lower housing shell, an inner surface of said lower housing shell defining the lower periphery of a storage compartment;
- said storage compartment being physically and electrically isolated from said computer;
- sliding means, for slideably connecting said upper housing to said lower housing shell, whereby upon application of an external force said upper housing may be slid in parallel alignment to said lower housing shell to selectably expose and conceal said storage compartment; and
- latching means that when engaged maintain said upper housing and said lower housing shell with said storage compartment in a concealed arrangement.

8. An improved integral keyboard and storage organizer according to claim 7, further comprising an electronics access compartment through which electrical components are accessible yet segregated from said storage compartment.

9. An improved integral keyboard and storage organizer according to claim 1, 4, 7, 6, 2 or 8 further comprising locking means that when engaged maintain the relationship between said upper housing shell and said lower housing shell and prevent access to said storage compartment.

* * * * *